A. P. H. TRIVELLI.
RENOVATED CINEMATOGRAPH FILM.
APPLICATION FILED AUG. 3, 1916.
1,205,822. Patented Nov. 21, 1916.
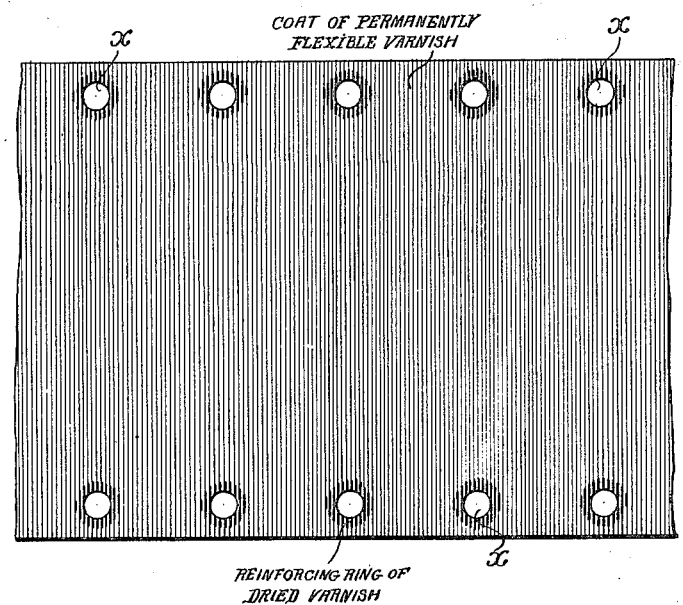
Witness
J. H. Crawford
Inventor
A. P. H. Trivelli, by
Howson & Howson, Attorneys

UNITED STATES PATENT OFFICE.

ADRIAAN PETER HERMAN TRIVELLI, OF THE HAGUE, NETHERLANDS.

RENOVATED CINEMATOGRAPH-FILM.

1,205,822.  Specification of Letters Patent.  Patented Nov. 21, 1916.

Application filed August 3, 1916. Serial No. 113,016.

*To all whom it may concern:*

Be it known that I, ADRIAAN PETER HERMAN TRIVELLI, a subject of the Queen of the Netherlands, residing at Bentinckstraat 129, The Hague, Netherlands, have invented a certain new and useful Improved Renovated Cinematograph-Film; and I do hereby declare the following to be a full, clear, and exact description of the invention.

Cinematograph films have the disadvantageous feature of being very liable to damage when being used and when being handled. Owing to its continuous winding and unwinding, the film on both faces soon shows shallow scratches causing the so-called "raining" of the film, and the object of the invention is the removal of these scratches.

The "rain" may be removed by filling up the said scratches with varnish having approximately the same refractive index as the gelatin and celluloid (the materials composing the two layers of the film). It might on first consideration of the matter seem to be feasible to use one of the well known celluloid or pyroxylin varnishes. In practice however these known substances, which are very suitable for varnishing thick celluloid articles, were found to give very unsatisfactory results when being applied to cinematograph films. The usual solvent for celluloid is a mixture of amylacetate and acetone. In this solvent however the celluloid readily swells and if the layer of celluloid is very thin, as is the case with cinematograph films, it begins to curl and twist, and soon becomes entirely useless.

According to the present invention the film to be renovated is coated with a varnish, the solvent of which does not attack the layer of celluloid of the film, or which, if it does attack celluloid, is mixed with a substance which will prevent such action, so that the coat of varnish may have dried before the celluloid begins to swell.

If pyroxylin is to be dissolved, I may use a solution thereof in a solvent comprising methyl alcohol, but as the latter eagerly attacks celluloid, I add ethyl alcohol to the solution. Ethyl alcohol dissolves the celluloid extremely slowly; the concentration in which pyroxylin is used in varnishes being very low, the addition of ethyl alcohol to the solution will cause no precipitation. I thus get a varnish in which the pyroxylin is dissolved in a solvent comprising methyl alcohol and ethyl alcohol, and this varnish, inasmuch as it is applied in a very thin layer, does not attack the film as it will have hardened before the celluloid of the film begins to swell. Instead of pyroxylin, *i. e.* nitrate of cellulose, I may use acetate of cellulose or higher homologues of cellulose compounds and dissolve these in methyl alcohol and ethyl alcohol; to this solution I may still add, if so desired, any one or more of the following drying oils, resins, salts of resin acid, in order to vary the flexibility, the hardness, the toughness or the refractive index of the varnish. A varnish of this class may be composed as follows:

I.
| | | |
|---|---|---|
| Methyl alcohol | 25 parts | to 35 parts. |
| Ethyl alcohol | 67 " | " 57 " |
| Pyroxylin | 2 " | " 3 " |
| Drying oils | 5 " | " 4 " |
| Salts of resin acid | 1 " | " 1 " |

If I exclusively use solvents that practically do not attack celluloid, that is to say suitable alcohols, (such as ethyl alcohol), hydrocarbons (*e. g.* benzol) or esters (*e. g.* methyl valerianate), separately or in combination, in which substances pyroxylin cannot be dissolved or dissolves only with great difficulty the pyroxylin is substituted by drying oils, *i. e.* by vegetable oils which by boiling or by some other suitable treatment have become oxidizable. Instead of or in combination with drying oils I may also use resins or salts of resin acids. As examples of this latter class of varnishes I give the following suitable compositions:

II.
| | | |
|---|---|---|
| Benzol | 95 parts | to 90 parts. |
| Drying oils | 5 " | " 10 " |

III.
| | | |
|---|---|---|
| Ethyl alcohol | 50 " | " 60 " |
| Methyl valerianate | 45 " | " 35 " |
| Drying oil | 5 " | " 5 " |

It is of course to be understood that the above classes of varnishes may be combined in various ways without departing from the invention.

When applying my varnish for coating films I preferably proceed in such a manner, that the film to be treated is slowly drawn through the varnish. The perforations of the film are hereby filled up, owing to the well known property of colloidal substances, such as varnishes, to readily form thin membranes. These membranes will, before having hardened, burst or crack and thereby form thickened rings at the perforations. These thickened rings are of great importance for the durability of the whole film, as it is a well known fact that a film is useless as soon as its perforations are damaged, and such damage is not likely to take place in case the perforations are protected by thickened rings of a flexible, tough and hard material.

The accompanying drawing shows an elevation of a film treated in accordance with the present invention.

The film is coated with a closely adherent layer of permanently flexible varnish by the means above indicated, and the said film, before treatment, is provided with rows of holes $x$, at uniform distances apart, along both its edges. The darkened portion surrounding these holes, indicates the reinforced ring of dried varnish, which may be produced by the process above described.

Certain matter described herein is claimed in my copending application, Serial No. 37,366 filed June 30, 1915.

Having now particularly described and ascertained the nature of my said invention and in what manner the same is to be performed, I declare that what I claim is:

1. A cinematograph film, having its surfaces coated with a closely adherent layer of varnish, the said layer in a dried state being transparent and permanently flexible and having substantially the same coefficient of refraction as the said film, said varnish layer comprising a cellulose ester, drying oil and a salt of a resin acid.

2. A cinematograph film, having its surface coated with a layer of a transparent varnish comprising a salt of a resin acid, said layer being of approximately the same coefficient of refraction as the substance of the film.

In testimony whereof I have signed my name to this specification, in the presence of two subscribing witnesses.

ADRIAAN PETER HERMAN TRIVELLI.

Witnesses:

WILLEM JOHANNES VAN DER MEER,
PETRUS JOHANNES FRANCISCUS
JACOBUS SCHNEBBELIC.